(12) United States Patent
Verma et al.

(10) Patent No.: US 12,511,112 B2
(45) Date of Patent: Dec. 30, 2025

(54) AUTOMATED UPDATE MANAGEMENT FOR CLOUD SERVICES

(71) Applicant: Microsoft Technology Licensing, LLC, Redmond, WA (US)

(72) Inventors: Nidhi Verma, Bellevue, WA (US); Rahul Nigam, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 18/191,031

(22) Filed: Mar. 28, 2023

(65) Prior Publication Data

US 2024/0303062 A1   Sep. 12, 2024

(51) Int. Cl.
*G06F 8/65*     (2018.01)
*G06F 11/07*    (2006.01)
*H04W 28/02*    (2009.01)

(52) U.S. Cl.
CPC ............ *G06F 8/65* (2013.01); *G06F 11/0751* (2013.01); *H04W 28/0268* (2013.01)

(58) Field of Classification Search
CPC .... G06F 8/65; G06F 11/0751; G06F 11/3692; H04W 28/0268
See application file for complete search history.

(56) References Cited

U.S. PATENT DOCUMENTS 11,422,790 B1 * 8/2022 Zahn .................. G06F 8/65
2018/0373521 A1  12/2018 Huang et al.
2022/0050674 A1   2/2022 Liljeback
2022/0350509 A1  11/2022 Verma et al.
2024/0069886 A1 * 2/2024 Verma ................ G06F 8/65

FOREIGN PATENT DOCUMENTS

DE   102018113625 A1 * 7/2019 .......... G06F 11/0739

OTHER PUBLICATIONS

Translated DE 102018113625 A1 (Year: 2019).*
Euna Kim et al.; Automatic State Saving and Rollback in ns-3; ACM; pp. 263-266; retrieved on Jul. 11, 2025 (Year: 2017).*
(Continued)

*Primary Examiner* — S. Sough
*Assistant Examiner* — Cuong V Luu
(74) *Attorney, Agent, or Firm* — Han Gim; Newport IP, LLC

(57) ABSTRACT

An orchestration system implements a rollout service that deploys a series of updates to a cloud service while minimizing an impact of a regression caused in the cloud service by one of the updates. The system includes an orchestrator host computer hosting the rollout service; a network interface with a network on which the cloud service is provided; and a database of deployment policy information and records of previous updates to the cloud service. The rollout service automatically determines a deployment policy for an update using the database, implements a deployment of the update according to the deployment policy, monitors for evidence of a regression caused by the update, and identifies occurrence of the regression caused by the update to the cloud service to enable mitigation of an impact of the regression.

18 Claims, 13 Drawing Sheets

(56) References Cited

OTHER PUBLICATIONS

Demarne, et al., "Reliability Analytics for Cloud Based Distributed Databases", Proceedings of the 2020 ACM SIGMOD International Conference on Management of Data, Jun. 11, 2020, pp. 1479-1492.
International Search Report and Written Opinion received for PCT Application No. PCT/US2024/019330, Jun. 19, 2024, 20 pages.
International Preliminary Report on Patentability (Chapter I) for PCT Application No. PCT/US2024/019330, Oct. 9, 2025, 14 pages.

\* cited by examiner

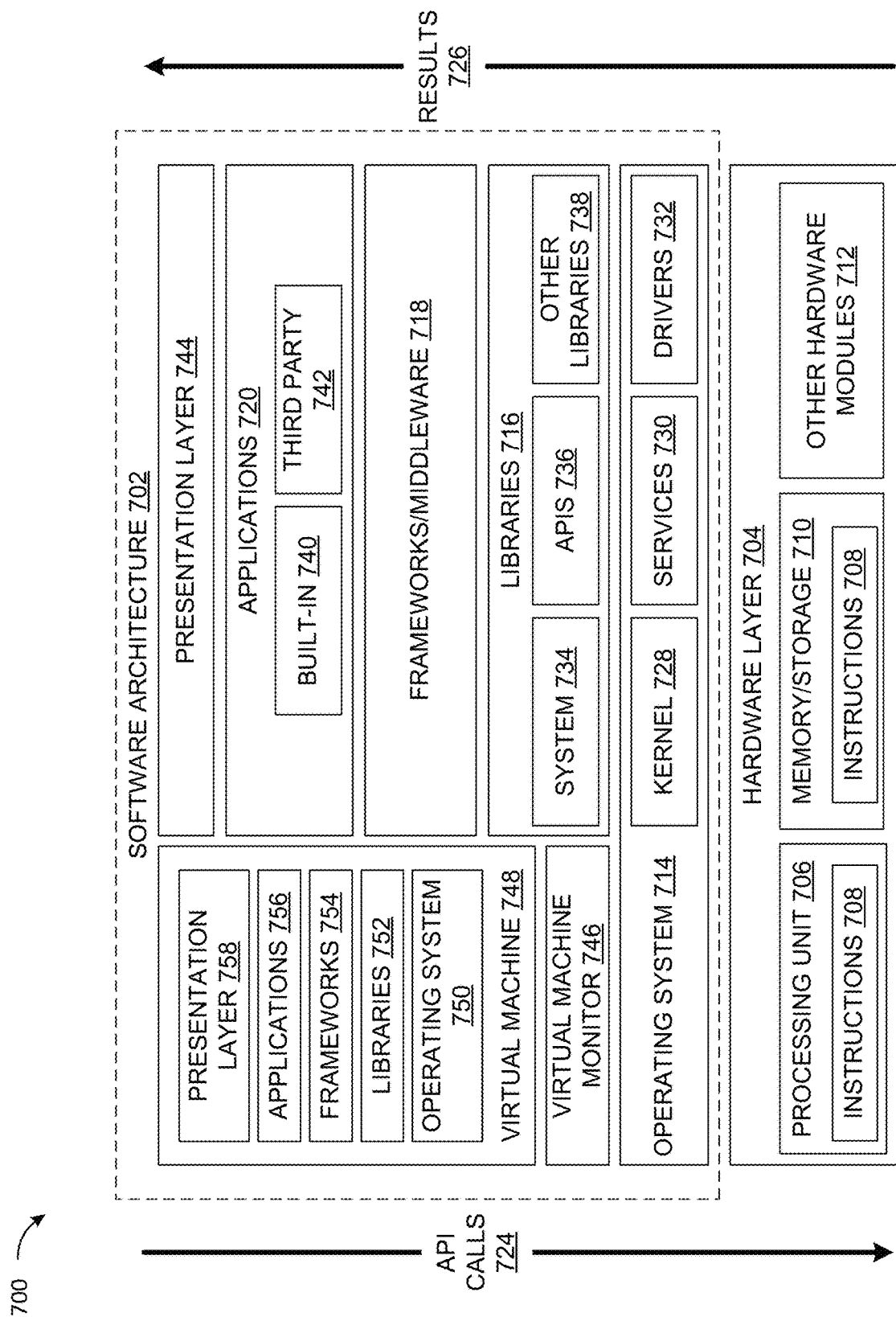

AUTOMATED UPDATE MANAGEMENT FOR CLOUD SERVICES

BACKGROUND

Cloud-based services are services that are provided to users over a computer network, such as the Internet or a Local Area Network (LAN). Cloud-based services may provide processing resources, analytics, storage, and network resources to customers. These services may include, but are not limited to applications for creating, consuming, and/or modifying content, file storage and management platforms, collaboration and communications platforms, and other types of software as a service (SaaS).

The architecture of a typical cloud-based service includes numerous servers, network devices, and storage elements to support the services provided. These devices include software, data, and configuration files that need to be periodically updated to add new features, to roll out fixes to software and/or to the configuration. Additionally, some services may support agent software installed on the client devices, and this software may also need to be updated to a newer version to support added features and/or to fix problems associated with a current version.

Updates are typically rolled out in multiple stages to different groups of users. This can mitigate the risk that unintended negative side effects may result when deploying the new version of the software and/or configuration data. This approach is referred to as ring deployment in which the deployment process is represented by an expanding series of rings, where each ring includes deploying the update to a larger subset of the userbase. Thus, for each successive ring, the software and configuration that support a corresponding subset of the userbase is updated. In this way, if problems are encountered, the problems can be limited to a subset of the userbase rather than potentially effecting the entire userbase. User feedback and telemetry data may be collected from users associated with each ring to determine whether the new version of the software is operating correctly before deploying the updates to the next ring. This process may continue until the update is deployed across the entire userbase.

When an update causes an adverse impact on the users or administrators of the cloud service, this is referred to as a regression. Current approaches deploy a series of updates sequentially across the various systems of the cloud-based service, which creates a single point of failure for the deployment of updates. Multiple versions of an update may be ready for simultaneous deployment to different rings of the cloud-based service. However, if a first version of the software introduces a regression, for example, a feature that was previously working stops working, the deployment of the other versions of the update to other rings may also be halted whether or not these updates also include the feature that experienced the regression. In a typical cloud-based service, there may be multiple updates that need to be deployed, with each update including multiple versions. Consequently, a failed deployment may incapacitate the entire deployment framework and introduce significant delays in the deployment of other scheduled updates. For this reason, there is a need for improved systems and methods for deploying updates to cloud services.

SUMMARY

An example orchestration system according to this disclosure implements a rollout service that deploys a series of updates to a cloud service while minimizing an impact of a regression caused in the cloud service by one of the updates. The system includes an orchestrator host computer hosting the rollout service; a network interface with a network on which the cloud service is provided; and a database of deployment policy information and records of previous updates to the cloud service. The rollout service automatically determines a deployment policy for an update using the database, implements a deployment of the update according to the deployment policy, monitors for evidence of a regression caused by the update, and identifies occurrence of the regression caused by the update to the cloud service to enable mitigation of an impact of the regression.

In another aspect, this disclosure describes a method of rolling out updates to a cloud service to minimize impact of a regression caused in the cloud service by a corresponding update. this method includes: detecting the regression caused by the corresponding update in the cloud service; measuring an impact of the regression on the cloud service; and when the impact exceeds a threshold, automatically mitigating the regression.

In another aspect, this disclosure describes a method of rolling out updates to a cloud service to minimize impact of a regression caused in the cloud service by a corresponding update. This method includes: periodically inserting a planned fault that will cause a regression in an update being implemented to test response of a rollout service to a resulting planned regression; detecting the planned regression caused by the update in the cloud service; and mitigating the planned regression.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 7 is a block diagram showing an example software architecture, various portions of which may be used in conjunction with various hardware architectures herein described, which may implement any of the described features.

DETAILED DESCRIPTION

As noted above, a cloud service may be regularly updated to add new features, improve function, or fix bugs or other errors. In some large-scale cloud services, there may be hundreds of changes being implemented each minute. While many of the changes are minor, some are significant changes.

Any change has the potential to cause unintended and adverse effects on or within the cloud service. When an update causes an adverse impact on the users or administrators of the cloud service, this is referred to as a regression. Given the speed and volume of updates that might be made, finding and mitigating a regression may be difficult. Any delay in resolving a regression will increase the negative impact on the users of the cloud service. Consequently, the present disclosure describes a technical solution for more safely deploying changes to a cloud service to identify, quantify and, sometimes, mitigate regressions that occur. This solution may be viewed as an end-to-end solution.

Figure 1:
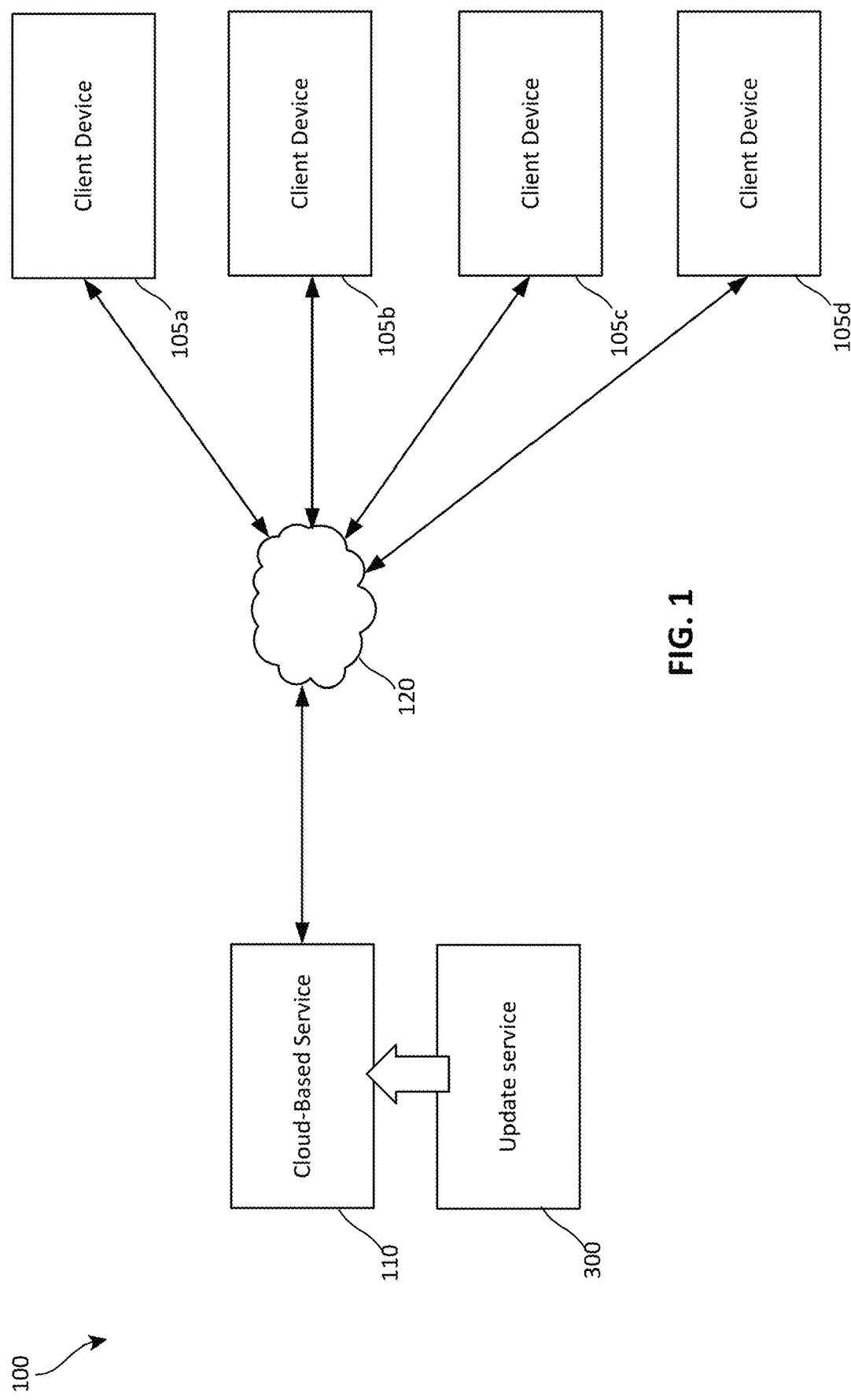
FIG. 1 is a diagram showing an example computing environment in which the techniques disclosed herein may be implemented.

FIG. 1 is a diagram showing an example computing environment 100 in which the techniques for safely deploying updates to cloud-based services are implemented. The computing environment 100 includes a cloud-based service 110 that provides any of the services discussed below or any other cloud-based service to clients. The example computing environment 100 also includes one or more client devices, such as the client devices 105a, 105b, 105c, and 105d, referred to collectively at client devices 105. The client devices 105 communicate with the cloud-based service 110 via the network 120. The network 120 may be a dedicated private network or the combination of public and private networks commonly referred to as the Internet.

In the example shown in FIG. 1, the cloud-based service 110 is implemented as a single cloud-based service or set of services. These services may include, but are not limited to, applications for creating, consuming, and/or modifying content, file storage and management platforms, collaboration and communications platforms, and other types of software as a service (SaaS). The cloud-based service 110 may include numerous servers, network devices, storage elements and other components to support the various services that are provided by the cloud-based service. Logically, the cloud-based service can include different groups of virtual machines referred to as farms. Physically, the farms are supported by one or more computer servers configured to provide computational and/or storage resources for the virtual machines of the cloud-based service 110.

Each farm may be configured to provide fail-over protection so that, if a virtual machine or computer server within the farm experiences a failure, the tasks assigned to that unit are handed off to another unit within the farm. The farm may also be configured such that one or more machines are taken offline temporarily to facilitate updates to the software and/or configuration data. For example, in a farm of 200 virtual machines, only 20 virtual machines may be updated at a time while the other machines continue to provide service. This continues until the entire farm is updated. Other architectures are also possible.

A deployment policy generated for an update to the cloud-based service 110 accounts for the specific architecture and configuration of the virtual and hardware components involved. Furthermore, the cloud-based service 110 may also include other hardware and software to support various processes and services that support and maintain the various components of the cloud-based service 110.

The client devices 105 are computing devices that can be implemented as a portable electronic device, such as a mobile phone, a tablet computer, a laptop computer, a portable digital assistant device, a portable game console, and/or other such devices. The client device 105 can also be implemented in computing devices having other form factors, such as a desktop computer, vehicle onboard computing system, a kiosk, a point-of-sale system, a video game console, and/or other types of computing devices. While the example implementation illustrated in FIG. 1 includes four client devices, other implementations may include any number of client devices that utilize the cloud-based service 110. Furthermore, some features of the services provided by the cloud-based service 110 can be implemented with a native or agent application installed on the client device 105. The native application may communicate with the cloud-based service 110 over a network connection to exchange data with the cloud-based service 110 and/or to access features implemented on the cloud-based service 110.

As noted above, the cloud-based service 110 will regularly receive any number of updates to support and improve operations. Updates may be made to implement new features in the service or to fix issues occurring in the service. These updates may be of several types. For example, updates may be made to the control layer, to the microservices or code, or to the configuration of the cloud-based service 110 or any of its underlying components. Code changes are also referred to as binary changes. As shown in FIG. 1, an update service 300, also referred to as an orchestrator, applies updates to the cloud-based service 110.

However, making any update to the service 110 can have unintended and unforeseen consequences. For example, a feature that was previously working may stop working due to a conflict in an update. In some examples, the entire service may stop functioning due to a faulty update. In other examples, the service may simply function more slowly after an update. Any adverse impact on the users, administrators, or useability of the cloud-based service 110 is known as a regression. One issue with regressions is that different cloud-based services support different clients with different levels of criticality. For example, a cloud-based service supporting operations at a hospital may have life-threatening consequences if a regression is experienced. Whether a regression is life-threatening or less critical, operators of the service 110 will strive to minimize the impact of any regression on users of the service 110. Consequently, as will be described below, the update service 300 is structured to safely apply updates to the cloud-based service 110. In different examples, this includes automatically recognizing and mitigating regressions that may occur.

Figure 2A:
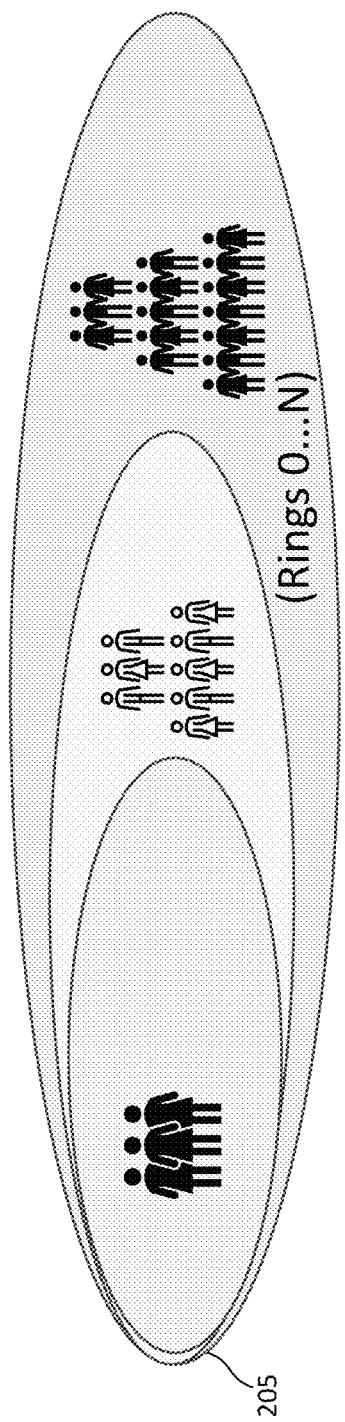
FIGS. 2A and 2B are diagrams showing example ring configurations for deploying updates on a cloud-based service architecture.

One mechanism for reducing the impact of any regression is a staged or ring-based deployment of the update. FIG. 2A is a diagram showing a representation of a ring configuration 205 for deploying updates on a cloud-based architecture, such as that of the cloud-based service 110 shown in FIG. 1. Each ring may be associated with a number of users of the services provided by the cloud-based service 110. The number of users associated with each subsequent ring usually increases until the entire userbase has access to the updates that are being deployed. The number of rings associated with a particular deployment may depend upon the specific update to be deployed, the architecture of the cloud-based service 110, the risk associated with the specific update, and/or other factors that will be discussed in detail in the examples which follow.

The cloud-based service 110 may be configured to receive telemetry data associated with the updated software and/or user feedback data indicative of the performance of the updates as the updates are deployed to each ring. The cloud-based service 110 may be configured to halt further deployment of the updates in response to the telemetry data and/or the user feedback data indicating that the updates are not operating as expected. Otherwise, the cloud-based service 110 will expand the rollout to the next ring in response to telemetry data and/or user feedback indicating that the updates appear to be operating correctly.

Each ring may include a subset of farms, servers and/or other components onto which the updates are deployed to provide the selected subset of users associated with each ring the updates. Furthermore, the rings earlier in the sequence of rings may include users that are specially selected for initial testing of the updates. For example, users associated with a company or other organization that provides the cloud-based service 110, and employees or other users associated with the company or organization may be included in the original ring or the earlier rings in the sequence. The rings may also be subdivided into multiple stages. Each stage may include a subset of the userbase. The deployment framework provided herein may be configured to selectively deploy specific versions of the update to specific rings and/or to stages of the rings based on the deployment policy associated with the update.

The term "build" refers to a collection of updates being deployed together as a package. Different builds may be deployed to different rings and/or stages of rings to provide certain features to certain users of the userbase. For example, certain users may have access to a version of an application that has certain features that may not be provided in other versions of the application. Furthermore, certain features may not be available to users in certain regions for legal or compliance reasons. For example, privacy laws may prohibit the collection of certain types of telemetry data from the client devices 105 of the user, and the version of the update deployed to such regions omits the functionality associated with the prohibited types of telemetry data. These examples illustrate how the deployment policy for an update may be customized so that the deployment framework can deploy different versions of a build to different rings and/or stages of the rings.

Figure 2B:
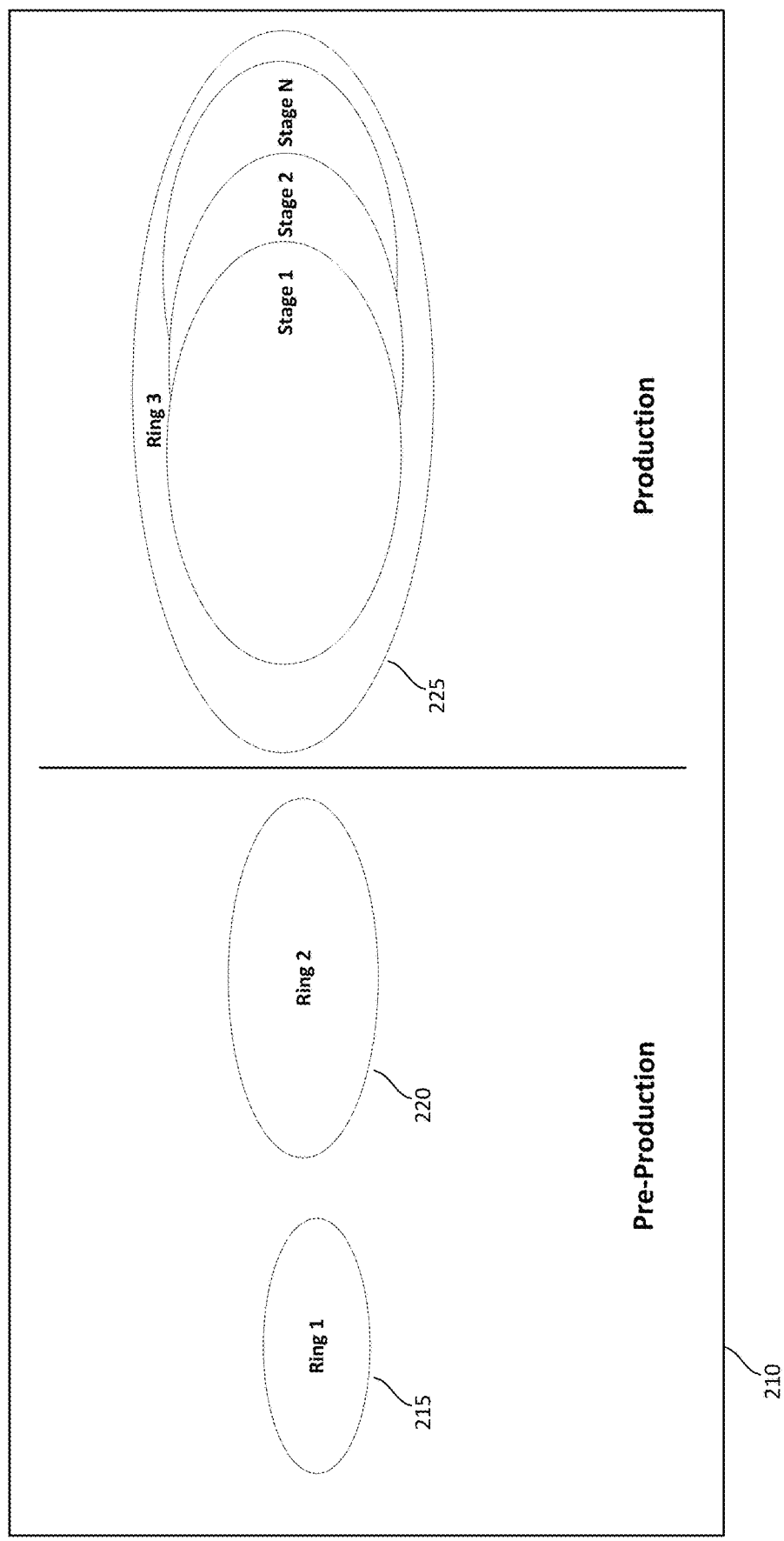

FIG. 2B is a diagram showing a representation of another example ring configuration 210 for deploying updates on a cloud-based architecture, such as that of the cloud-based service 110 shown in FIG. 1. The ring configuration 210 includes three rings 215, 220, and 225. In this example configuration, the first ring 215 and the second ring 220 are associated with users in a pre-production environments in which the updates are initially tested. The pre-production environment refers to an environment internal to a provider of the cloud-based service where updates can be deployed and tested before being exposed to customers of the cloud-based service. Subsequently, in the production environment, users who are customers of the organization that provides the cloud-based service are provided access to the updates.

In the illustrated example, the first ring 215 is associated with a first internal group of users associated with the organization. These users may include members of the development team, testing team, and/or others who have been selected as a first set of users to receive and utilize the update. The computing devices of the users and/or components of the cloud-based service 110 may provide telemetry data. The users themselves may be prompted by the cloud-based service 110 to provide feedback on the update. This telemetry data and/or the user feedback are analyzed to determine whether the updates are operating as expected. The cloud-based service 110 may halt the deployment to the subsequent rings of the ring configuration 210 in response to determining that the updates are not operating as expected. Otherwise, the deployment process may continue with deploying the updates.

In the example shown in FIG. 2B, the updates are next rolled out to additional users within the preproduction environment. In this example, the organization has many employees who are also users of the services provided by the cloud-based service 110. For example, the first ring 215 includes approximately 20,000 users, and the second ring 220 includes approximately 100,000 users associated with the organization. The preproduction environment in this example may be implemented on a separate farm or set of farms than the production environment, and the updates may initially be deployed to the server or servers associated with the preproduction environment. In other implementations, the same farms or servers provide services to both the preproduction and production environments, and users are directed to the appropriate version of the software based on the group with which the users are associated. Telemetry and user data are collected from the users associated with the second ring 220, and the cloud-based service 110 may halt the deployment to the subsequent rings of the ring configuration 210 in response to determining that the updates are not operating as expected. Otherwise, the deployment process may continue with deploying the updates to the third ring 225.

The third ring 225 includes users that are using one or more production versions of the application or applications provided by the cloud-based service 110. Thus, the third ring 225 includes users that are outside of the organization and are customers who subscribe to the services provided by the cloud-based service 110. The third ring 225 may include a very large number of users. In this example, the third ring 225 may include millions or even billions of users. Thus, the third ring 225 may be further subdivided into stages, and each stage includes a subset of the users that make up the third ring 225. These stages are used to gradually roll out the updates to the full userbase and to provide another opportunity to collect and analyze telemetry data and/or user feedback from a broader userbase before deploying the updates to all users. Furthermore, each of the stages may represent internal ring boundaries used to subdivide the production userbase into logical groupings of users that utilize a specific production version. As discussed above, these subgroups of users may be determined based on the functionality available to the users within a particular subgroup.

Certain users may receive certain features that are not available to users in other subgroups. Some users may have access to customized version of the software for a particular corporation or other organization and/or may have licensed a premium version of the application or applications provided by the cloud-based service 110 that include additional features. The subgroups may also be based on legal considerations. As discussed in the preceding examples, certain features of the application or applications may be precluded from certain countries or regions due to legal requirements, and the version of the update deployed to such regions will not include these features. Whereas the example shown in FIG. 2B includes three rings, other implementations may utilize a different number of rings based on the size of the userbase, complexity, and risk associated with the deployment.

Figure 3:
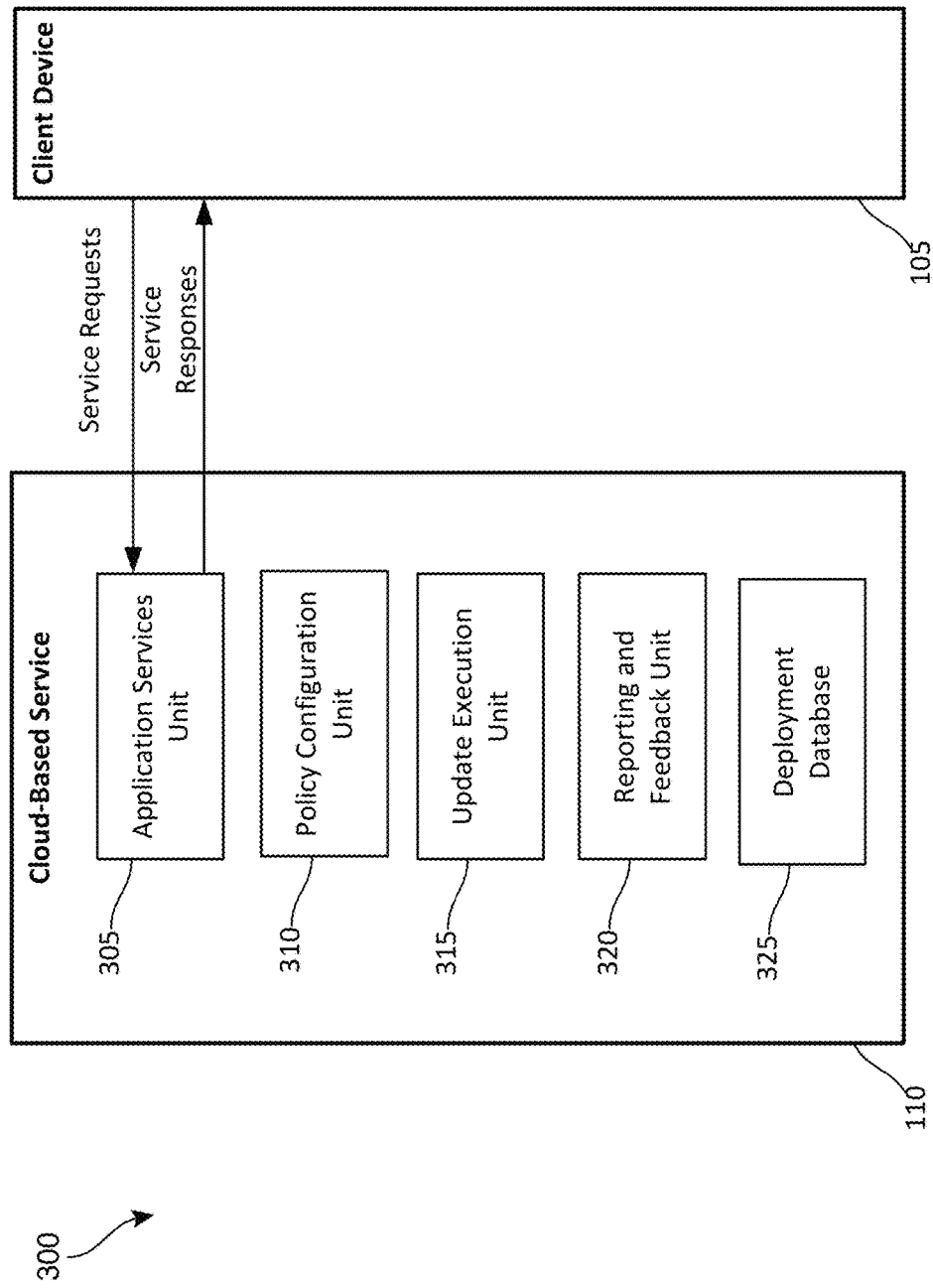
FIG. 3 is a diagram showing additional details of the update execution unit of the cloud-based service 110 of FIG. 1.

FIG. 3 is an example architecture 300 that may be used, at least in part, to implement the cloud-based service 110. The cloud-based service 110 includes an application service unit 305, a policy configuration unit 310, an update execution unit 315, a reporting and feedback unit 320, and a deployment database 325.

The application service unit 305 is configured to provide the various services offered to customers of the cloud-based service 110. The application service unit 305 is configured to receive service requests from the client devices 105 of users and to provide service responses to the client devices 105 of the users. The specific types of services provided by the cloud-based service 110 may vary. These services may include but are not limited to providing applications for creating, consuming, and/or modifying content, file storage and management platforms, collaboration and communications platforms, and other types of SaaS.

The policy configuration unit 310, the update execution unit 315, the reporting and feedback unit 320, and the deployment database 325 are configured to provide the policy generation and execution functionality described herein. In the example shown in FIG. 3, the policy generation and execution functionality are implemented on the cloud-based service 110 for which these functions are being performed. In other implementations, the deployment policy generation and execution functionality may be provided, at least in part, by separate services.

The policy configuration unit 310 is configured to receive a build policy configuration information about the update to be deployed. The cloud-based service 110 may provide a user interface in which an administrator provides information about the build. This user interface is illustrated and described as element 317 in FIG. 4A. The user interface may include options for specifying one or more target rings and/or stages of the one or more rings. The user interface may also provide means for inputting when the update should be deployed. The deployment of the update may be scheduled to be deployed immediately or on a specific day or time. The scheduling feature may be useful for deploying updates that include new features that are to be made available to users on a specific date. The user interface may also provide means for selecting the payload of the update to be deployed. The payload may include executable program content, scripts, and/or configuration data that may be deployed as part of the update. The payload may include multiple new features and/or fixes for problems. The policy configuration unit 310 creates a deployment policy for the build based on the information provided by the administrator via the user interface. The update execution unit 315 is configured to execute the deployment policies generated by the policy configuration unit 310.

The reporting and feedback unit 320 is configured to receive telemetry data from components of the cloud-based service 110 and/or client devices 105 of users. The reporting and feedback unit 320 may be configured to analyze the telemetry data and/or user feedback received to generate reports that show the performance of the update that has been deployed based on the analyzed data. The unit 320 may also automatically perform various actions in response to determining that the updates are not performing as desired.

The deployment database 325 is a database configured to store deployment policy information generated by the policy configuration unit 310 and data associated with the execution of the deployment policy. The deployment database 325 records for a deployment policy may include the location and/or file names of the payload to be deployed as the updates.

Figure 4A:
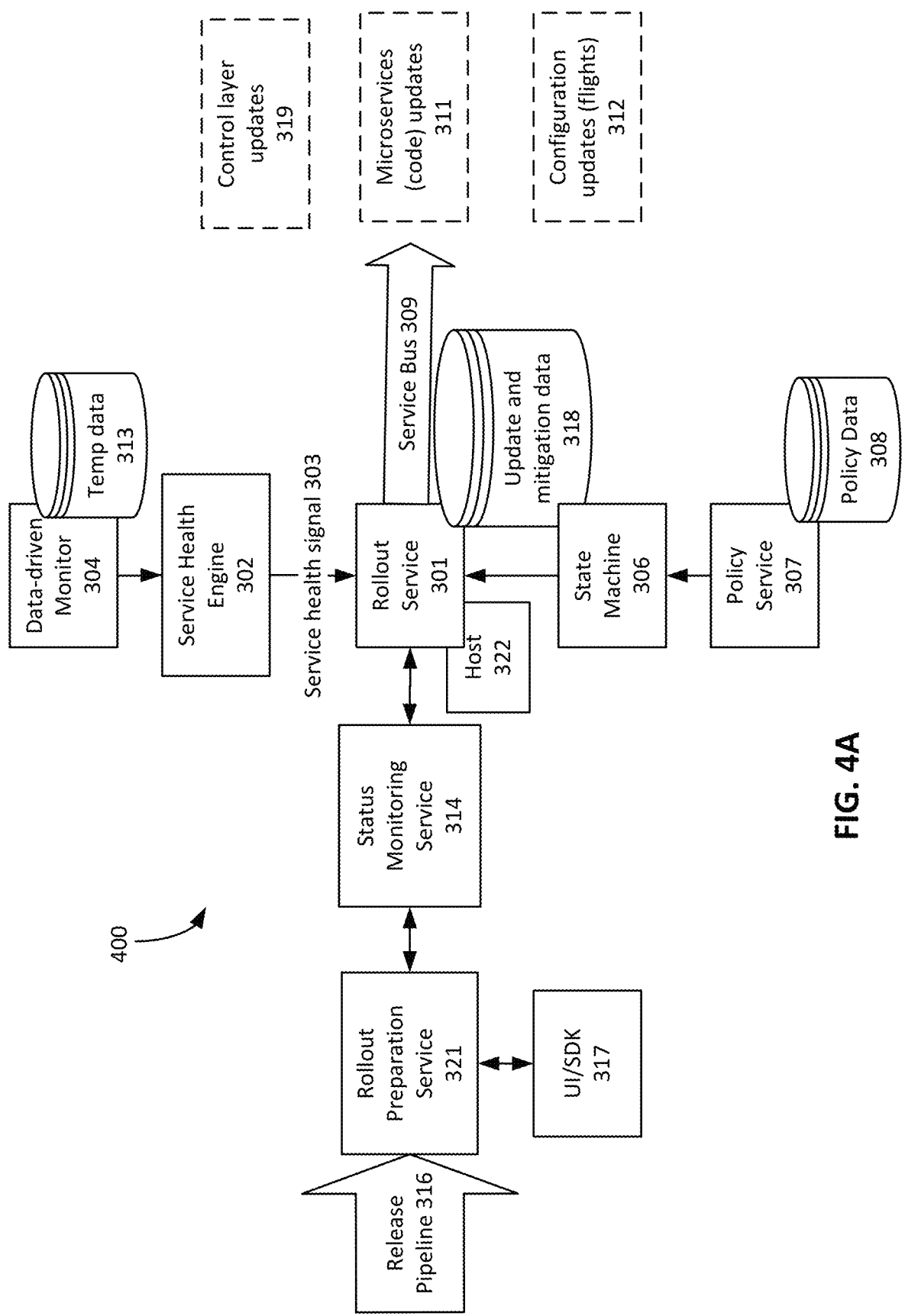
FIG. 4A is an example architecture that may be used, at least in part, to implement the cloud-based update service shown in FIG. 1.
Figure 4B:
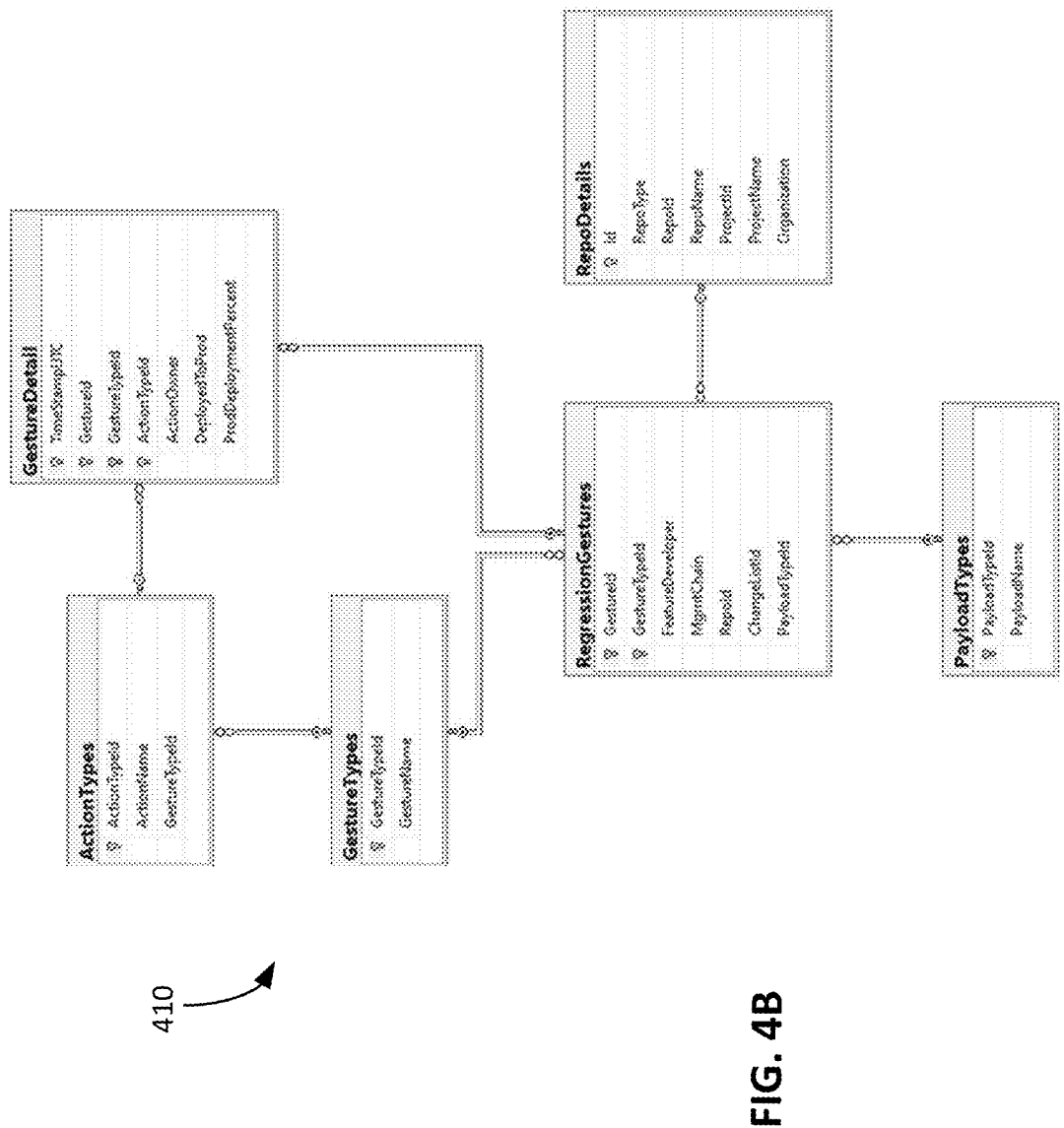
FIG. 4B illustrates a schema 410 for actions used to mitigate regressions.

An alternative representation of an update service for the cloud service 110, according to principles described herein, will be provided below in connection with FIG. 4A-4C. FIG. 4A is an example architecture 400 of the update service mentioned above with respect to FIG. 1. As shown in FIG. 4A, a release pipeline 316 provides the updates to be made to a cloud-based service. Any number of developers may be working on different aspects of the cloud-based service and may submit updates via the pipeline 316.

A rollout preparation service 321 receives the updates from the pipeline 316. The service 321 may package a number of updates together for a single rollout. This may be referred to as a build. A user or administrator may operate a user interface 317, including a software development kit (SDK), to control the operation of the rollout preparation service 321 and the packaging or organization of the updates to be rolled out together in a specific build.

When prepared, the build is provided to a rollout service 301 for deployment. This rollout service 301 is also referred to as an orchestrator and is hosted on a computer system with processing and memory resources referred to as the orchestrator host computer or machine 322 that includes a network interface. Thus, the orchestrator or rollout service 301 includes both software and hardware for implementing an update to the cloud service as described herein. In some examples, the orchestrator host machine 322 includes a server, or a number of servers, with an interface to the network on which the cloud service is provided.

The rollout or update data is stored in a database 318 operated by the rollout service 301. A status monitoring service 314 communicates the status of rollouts between the rollout service 301 and the rollout preparation service 321, as needed. Each of the components illustrated in FIG. 4A may be implemented on the same number of servers or devices as the rollout service 301 or different networked machines as illustrated.

The rollout service 301 is configured to minimize risk when implementing an update and to detect and mitigate regressions that do occur. For example, the rollout service 301 may include any of the following features: (1) Automatic monitoring of QoS signals and other regression detection means to detect and measure the impact of regressions in the cloud service. (2) Use of the risk level associated with an update to determine a deployment strategy, e.g., an amount of the userbase to include in a ring or stage. A high-risk change will be deployed to a lesser proportion of the userbase. (3) Visibility of rogue changes. When a regression is identified and matched with a change that caused the regression, this information can be displayed in a user interface for administrators and clients. (4) Rapid recovery in response to identified regressions, such as rolling the system back to a state with a Last Known Good (LKG) tag. The rollout service 301 will create such tags during operation and can create them more frequently when riskier change types are being deployed. This may also include the planned insertion of faults into an update to determine how/whether the system responds and recovers. (5) Improved safe rollout technology resiliency.

The rollout service 301 will deploy the update via a service bus 309 which is part of the network interface between the rollout service 301 and the network on which the cloud service is provided. The service bus 309 includes the network connecting all the components of the cloud service, for example, a Local Area Network covering the data center or server farm(s) that support the cloud service, a similar Wide Area Network or the internet. As noted above, the updates may be of different types including control layer updates 319, microservices or code updates 311 and configuration updates 312, also referred to as flights.

The deployment policy implemented by the rollout service 301 will be informed by several factors. For example, the deployment policy uses data-driven temperature monitoring as a basis for the deployment policy. This includes a data-driven temperature monitor 304 that monitors the activity level in different farms that may be supporting different segments of the user base. A farm is a collection of virtual machines that support or provide the cloud service to a segment of the userbase. A farm that is very active, i.e., receiving a lot of data traffic, may correspond to a part of the userbase that is heavily using the cloud service. This farm is considered to be "hot" or have a high temperature. A farm that is receiving less traffic is considered to be cooler and corresponds to a portion of the userbase that is making less use of the cloud service. The temperature data on the various farms is stored in a database 313 kept by the temperature monitor 304.

In a data-driven temperature-based rollout, the temperature monitor 304 provides the temperature data 313 as a factor in the deployment policy generated and implemented by the rollout service 301. For example, a segment of the userbase that is heavily using the cloud service, as indicated by a hot corresponding farm, may be placed in a later deployment stage of the rollout. In this way, if the rollout causes a regression, preventative or corrective action may be taken before the rollout impacts the segment of the userbase that is heavily using the cloud service. Segments of the userbase that are not heavily using the cloud service, as indicated by a cooler corresponding farm, can be placed in an earlier deployment stage. Consequently, if a regression occurs, the impact will be less intrusive to the userbase segment that is making less use of the cloud service than would be the impact on the userbase segment that is heavily using the cloud service. The temperature monitor 304 can monitor temperatures on a machine-by-machine basis, a client-by-client basis, a customer-by-customer basis, a user-by-user basis, etc.

The service health engine 302 is a system that monitors and detects the health of the cloud service. Thus, the service health engine 302 will monitor for, and automatically detect, regressions that occur during a rollout. The service health engine 302 will receive QoS signals from the components supporting the cloud service. With this information, the service health engine 302 will provide a service health signal 303 to the rollout service 301. This signal 303 may advise the rollout service 301 that the cloud service is doing well and a rollout can continue or that a regression has occurred and the rollout should be suspended. The service health signal 303 may also quantify the impact of a regression so that the rollout service 301 can determine when to rollback the state of the cloud service to a Last Known Good (LKG) state existing prior to the current regressed update.

The state machine 306 stores a succession of states through which the cloud service has evolved. Any of these states may be tagged as a "good state," meaning that the health of the cloud service was determined to be good when that state was in place. This determination can be made based on telemetry, including QoS signals, and user feedback. Consequently, if the rollout service 301 determines that the cloud service must be rolled back to a previous state to mitigate the impact of a change that is causing a regression, the rollout service 301 can retrieve the LKG state from the state machine 306 to return the cloud service to that state. The service bus 309 is then used by the rollout service 301 to push the LKG state out to the components of the cloud service.

Processing resources and time are needed to ascertain whether a current state is "good." Consequently, checking each distinct state for a possible "good" tag may introduce a significant resource overhead. Also, when an update is occurring, the nature of the update may indicate a level of risk. Some updates may make only relatively minor changes that entail little risk of causing a regression or a significant regression. Other changes may be more fundamental and carry a higher risk of causing a regression. To avoid unnecessary overhead, the rollout service 301 and state machine 306 may increase the frequency of states checked and tagged as "good" during the rollout of a high-risk change, but may decrease the frequency of states check and tagged as "good" during a lower-risk rollout.

The policy service 307 will provide other factors on which the rollout service 301 can determine an optimal deployment policy. For example, as noted above, different updates may have different associated levels of risk. The policy database 308 can include historical data of past rollouts in the cloud service and policy statements or rules set by an administrator. The policy database 308 may also designate some segments of the userbase as more sensitive to the impact of a regression. Using this data, the policy service 307 can consider the level of risk associated with a current rollout. If the level of risk is high, the policy service 307 will signal to the rollout service to implement a more gradual rollout with smaller initial segments of the userbase. The policy service 307 may also indicate which segments of the userbase are most sensitive and should not be included in early stages of the rollout. For example, hospitals, air traffic, government, first responders and other such clients may have critical reliance on the web service and should not be included in the early stage or stages of a rollout for which there is a significant risk of a regression. Based on the historical data and policy statements in the database 308, the policy service 307 may also signal the rollout service 301 as to how much time should be waited to detect for regressions between stages of a rollout. As before, this timeframe may be based on the type and risk level of the current update.

The various operations of the rollout service 301 will now be described in further detail. These operations are automated without any human intervention. This allows the rollout service 301 to protect the cloud service even as the cloud service scales up over time.

The first operation relates to automatic monitoring of QoS signals and other regression detection means to detect and measure the impact of regressions in the cloud service. As noted above, there are different types of changes that might be deployed as well as different QoS signals. For example, QoS signals may be categorized as Incoming, Outgoing, Internal, Scenario or Client. The rollout service 301 is configured to associate different QoS signals as being more relevant based on the type of change being deployed. For example, the service health engine 302 focuses on different QoS signals based on a type of update being deployed, where past regressions caused by different types of updates have been correlated to different QoS signals. Consequently, the rollout service 301 can focus on, or more heavily weight, the most relevant QoS signals based on the type of change being deployed. In this way, the detection of a regression is made more effective based on the type of change being deployed and how that type of change might most likely have a negative impact on QoS.

The rollout service 301 may also detect regressions by comparing the QoS signals received based on an earlier build as compared to those of a recently deployed build. If the recently deployed build or rollout causes a decrease in the QoS measured under a previous build, this can indicate a regression caused by the recently deployed build. Thus, build-to-build comparisons in terms of QoS signals enable the rollout service 301 to better identify and respond to regressions.

The rollout service 301 can also detect and rate the impact of a regression on part of the userbase. For any measure used to rate or quantify the impact, a corresponding threshold can be set. If the impact exceeds such a threshold, this can be used as a triggering event causing the rollout service 301 to take action to mitigate the regression, such as halting an update or returning the cloud service to a LKG state.

The impact of a regression may be measured in many different ways. For example, impact can be quantified in terms of how much to the cloud service is negatively affected by the regression, or for how much time the cloud service was down or non-functional due to the regression. The impact may also be measured in terms of a sudden decrease in the use of any feature of the cloud service. A sudden decrease in users using a feature, particularly an otherwise popular feature, will indicate that this feature may have been impacted by or experienced a regression. The amount of the decrease in the usual usage of the feature can be a measure of the impact of the regression. The impact may also be measured in terms of the time of day that the service was negatively affected by the regression. A regression that occurred during overnight hours may be rated as having less impact than a regression occurring during regular business hours. The type of customer can also be factored into the impact. For example, if the customer is a hospital that depends on uninterrupted access and full functionality of the cloud service, any regression is of greater impact than if the customer is, for example, an educational institution where an interruption in access or full functionality may be inconvenient, but not life-threatening. Financial services and other customers may also expect or demand continuous, uninterrupted service.

The second operation of the rollout service 301 is the use of the risk level associated with an update to determine a deployment strategy, e.g., an amount of the userbase to include in a ring or stage. The records of deploying past updates can be used to identify a level of risk associated with a current update. If a similar type of update in the past caused a significant regression, the current update may carry a higher risk than a different type of update with no such history. The rollout service 301 will determine a risk level associated with an update and factor this risk level into the deployment policy. For example, higher-risk change will be deployed to a lesser proportion of the userbase earlier on. A higher-risk change may also be deployed first to a segment of the userbase whose use of the cloud service is less critical. Deployment to a more critical segment of the userbase is deferred until the current update has been safely deployed to an earlier segment of the userbase.

The rollout service 301 may also identify new types of changes. For example, a change to each particular microservice may be considered a different change type. If a new microservice is added, the rollout service 301 can designate changes to that new microservice as a new type of change. The rollout service 301 can then begin tracking a history of this new change type as to its tendency or frequency of causing a regression. This obviates the need for a human administrator to declare a new change type.

Another operation of the rollout service 301 relates to determining visibility of rogue changes. When a regression is identified and matched with a change that caused that regression, this information can be displayed in a user interface for administrators and clients of the cloud service. This allows administrator of the cloud service to understand the regression that occurred and the change that caused it. This also allows an administrator of a customer system of the cloud service to understand the regressions that have occurred and their respective causes. Thus, in response to detection of a regression, the rollout service is to provide information about the regression and a change in the update matched to the regression to a number of administrators of client systems of the cloud service.

An addition operation of the rollout service 301 relates to rapid recovery in response to identified regressions. The time to mitigate (TTM) in response to a regression may be based, at least in part, on the criticality of the cloud service to a particular segment of the userbase. For example, as noted above, a hospital, first responder unit, utility or other customer may depend on the cloud service in support of life saving, sustaining or protective measures. For such a segment of the userbase, the rollout service 301 may respond to a detected regression earlier or based on lesser evidence of a regression than for a segment of the userbase whose dependence on the cloud service is less critical.

When the rollout service 301 responds to a regression, it seeks to mitigate the effect of the regression. For example, the rollout service 301 may act to roll the cloud service back to a state bearing a Last Known Good (LKG) tag. This is enabled as follows. Prior to a regression, the rollout service 301 may determine that a current state of the cloud service is "good" based on, for example, the QoS signals, no detected regressions, an absence of customer complaints or other factors. When a state is determined to be "good," the rollout service 301 can tag that state as such along with the capture of that state stored in the state machine 306. The rollout service 301 will create such tags during operation and can created them more frequently when riskier change types are being deployed.

The rollout service 301 will then make a determination when to rollback the state of the cloud service to the LKG state. This determination may be based, in part, on the measure of the impact of the regression made by the rollout service 301. For example, if the impact of the regression for some or all of the userbase is high, the rollout service 301 will more readily rollback the state in at least that portion of the userbase to the LKG state.

The ability of the rollout service 301 to perform rapid recovery may be tested without an actual regression occurring. The rollout service 301 may be instructed to insert a planned fault or faults into an update that are expected to cause a regression. This will allow an administrator of the cloud service to verify that the resulting intentional regression is detected by the rollout service 301 and that the rollout service 301 selects an effective or optimal mitigation strategy, as described herein. This "fire drill" can also allow the administrator to observe how quickly the rollout service 301 is able to respond to the intentionally caused regression.

The rollout service 301 also implements an improved safe rollout technology resiliency. FIG. 4B illustrates a schema 410 for actions used to mitigate regressions. This schema can be part of the repository or database 318 available to the rollout service 301. This database 318 can include, for example, a count of the regressions that slip to production and an aggregation of those regressions by date, change type and Global Error Model (GEM). GEM refers to a method of categorizing errors based on their frequency and impact. GEM is used to identify the most critical and frequent errors in a system or application and to prioritize them for resolution. By using GEM, development teams can focus their efforts on the most important issues, thereby minimizing the impact of regressions that slip into production. The database 318 can also include a value for the percentage saturation of production of a given regression. The database 318 may also store an average and percentile for the percentage of saturation of production for different regressions. These values may be aggregated by date, GEM and change type.

Figure 4C:
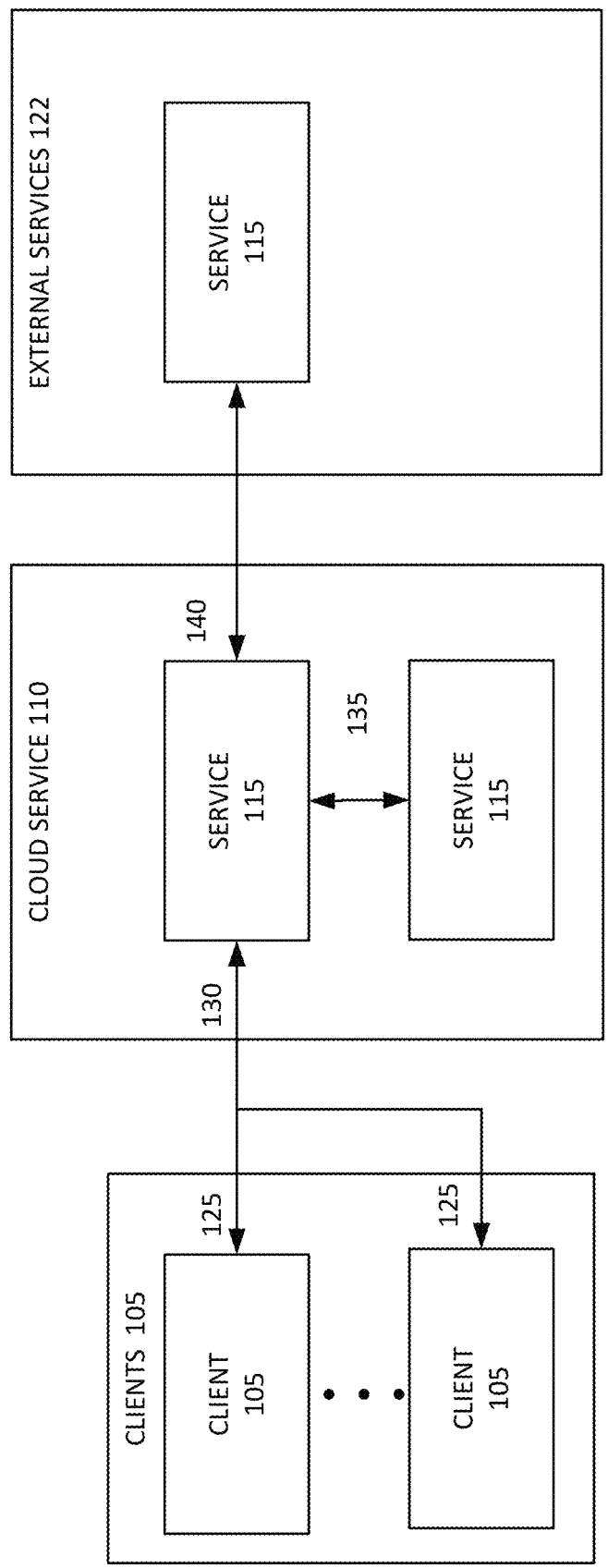
FIG. 4C is a diagram illustrating the different types of Quality of Service (QoS) signals used in the update techniques described herein.

FIG. 4C illustrates the various types of QoS signals utilized by the update service described herein. As shown in FIG. 4C, scenario QoS signals are input to the clients 105 from the cloud service 110. An incoming QoS signal 130 is the signal incoming to the cloud service 110 from the clients.

QoS signals 135 between different services 115 that compose the cloud service 110 are referred to as internal or service internal QoS signals. Lastly, the cloud service 110 may utilize services from another provider, i.e., external services 122, as part of the service package available to clients 105. Accordingly, QoS signals between the cloud service 110 and any external services are referred to as outgoing QoS signals. These are the different types of QoS signals.

In general, QoS signals within a cloud service refer to mechanisms that are used to ensure that the service meets specific performance and reliability requirements. These signals are typically implemented through a combination of network and software technologies that enable the service provider to prioritize different types of traffic and allocate resources accordingly. For example, QoS signals may track and indicate: (1) Performance: e.g., file upload and file download operations, (2) Reliability, e.g., active hydration QoS, object database (OBD) web file uploads QoS, OBD web get data QoS, portal classic QoS, list and libraries QoS, Web Application Companion (WAC) file open QoS, and portal classic slow request QoS; and (3) Cost of Goods Sold (COGS)/compute, e.g., central processing unit (CPU) health for top applications, health check for memory and stress/load generation.

Figure 5A:
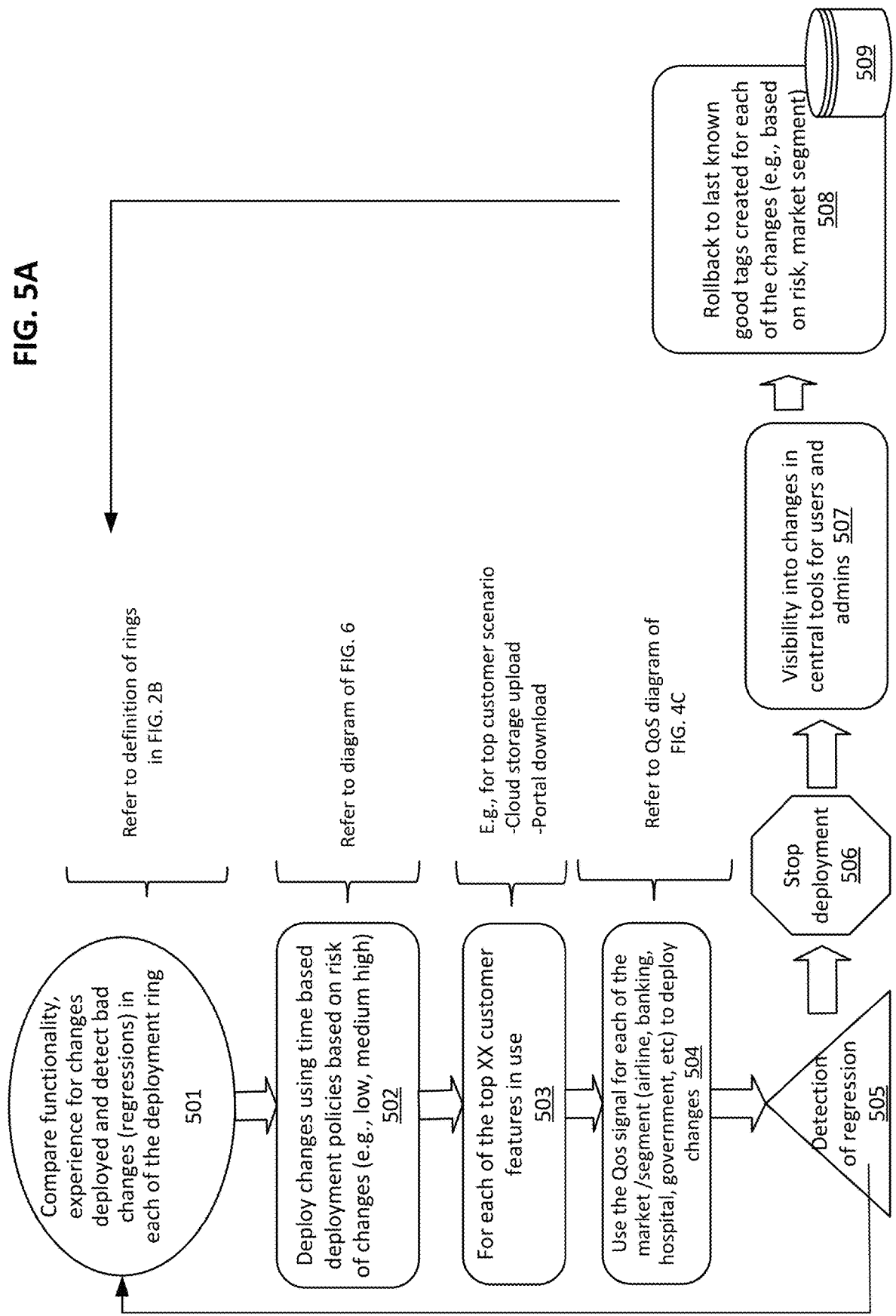
FIG. 5A is a diagram of an end-to-end solution for updating a cloud service according to the principles described herein.

FIG. 5 is a conceptual diagram of the end-to-end solution described herein for increasing the safety and minimizing the negative impact of updates to a cloud service. As shown in FIG. 5, the service detects regressions 501. For example, the regression detection is done by comparing functionality and/or experience of users to the functionality or service level before the deployed change so as to detected changes that are causing a regression in each of the deployment rings. An example of deployment rings, including pre-production and production rings, is shown in FIG. 2B.

Changes can be deployed by the rollout service using time-based deployment policies 502 that are based on the risk level of the changes (e.g., low, medium, high). This can provide time for the system to appropriately detect and react to a regression before that regression has a larger impact on the userbase. The time-based deployment policy approach will be described in further detail below in connection with FIG. 5B.

In seeking to detect a regression, particular attention can be given to a subset of the top customer features in use 503. As noted above, a change in the use of a top feature may indicate to the system a regression that is preventing the usual usage of that feature.

Additionally, QoS signals for different segments/markets of the user based can be considered 504. For example, as noted above, some segments of the userbase are more sensitive to a regression than others. Accordingly, more care can be given to sensitive segments of the userbase based on QoS signals corresponding to that userbase segment. Please refer to FIG. 4C for a diagram of the different types of QoS signals for analysis.

Using these different strategies, the system seeks to rapidly and automatically detect regressions 505. The automated detection and mitigation of regressions can make the cloud service much more robust and increase user satisfaction and confidence. When a serious regression is detected, a current deployment can be stopped 506 to mitigate the impact.

As described above, detected regressions and the update that caused each regression provide useful information both to the operators and the consumers of the cloud service. Consequently, visibility of the changes 507 that caused regressions can be provided by displaying the information in central tools available to users and administrators both of the provider and the consumers of the cloud service. In other words, visibility of the detected bad changes and resulting regressions can be provided to and display for both the pre-production and production rings of FIG. 2B.

As also described above, when needed to mitigate a regression, the service can rollback the cloud service 508 to a state with a last known good tag. Previous states of the cloud service, including those tagged, are stored in a database 509. As noted above, the frequency of good tags in the record states of the cloud service can be increased based on an increased risk of a current rollout or based on the sensitivity of a market segment receiving the current rollout.

Figure 5B:
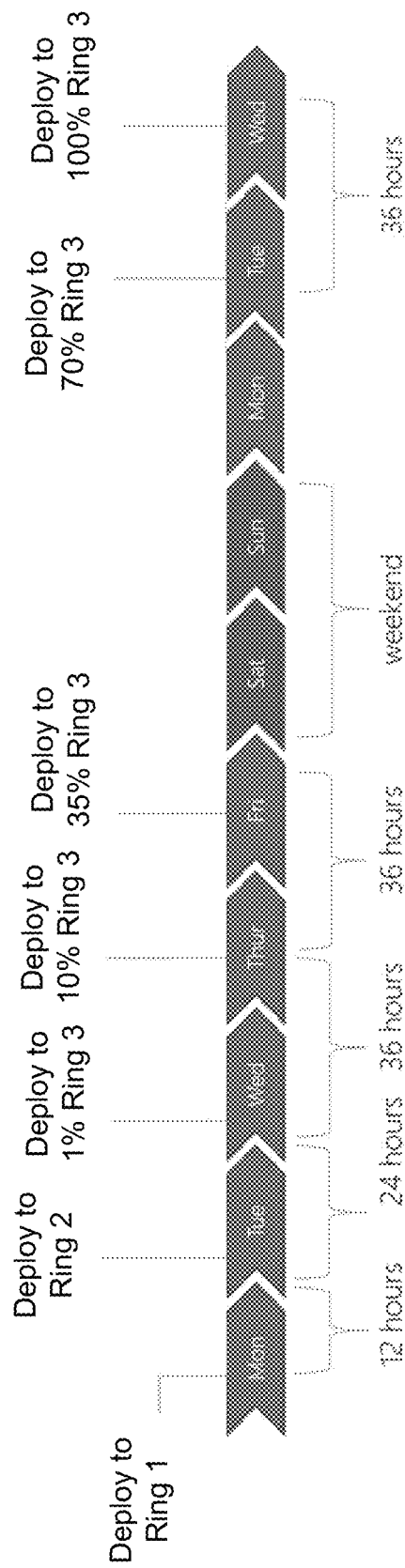
FIG. 5B is a diagram of a timed update rollout used in the principles described with respect to FIG. 5.

FIG. 5B illustrates one example of a time-based deployment policy, as mentioned above. As shown in FIG. 5B, the initial deployment may be to a pre-production ring, e.g., ring 1 of FIG. 2B. This may be on a Monday and be given the first 12 hours of the rollout. On Tuesday, the update is deployed to the second pre-production ring, e.g., ring 2 of FIG. 2B. This may be given up to the first 24 hours of the rollout. Again, these amounts of time allow for detection and mitigation of a regression.

After this, deployment to the production ring, e.g., ring 3 of FIG. 2B, begins. Over Wednesday and into Thursday, the update is deployed to the first 1% of ring 3. Thursday to Friday, the next 36 hours, the update is deployed to the first 10% of ring 3. Deployment then expands for the first 35% of the ring 3 on Friday. This deployment continues over the weekend. On Tuesday of the following week, deployment expands to 70% of the ring 3. Then, on Wednesday, the deployment is finally pushed to the remainder or 100% of ring 3, e.g., the production ring. Again, this graduated, time-based deployment allows for detection and mitigation of a regression.

Figure 6A:
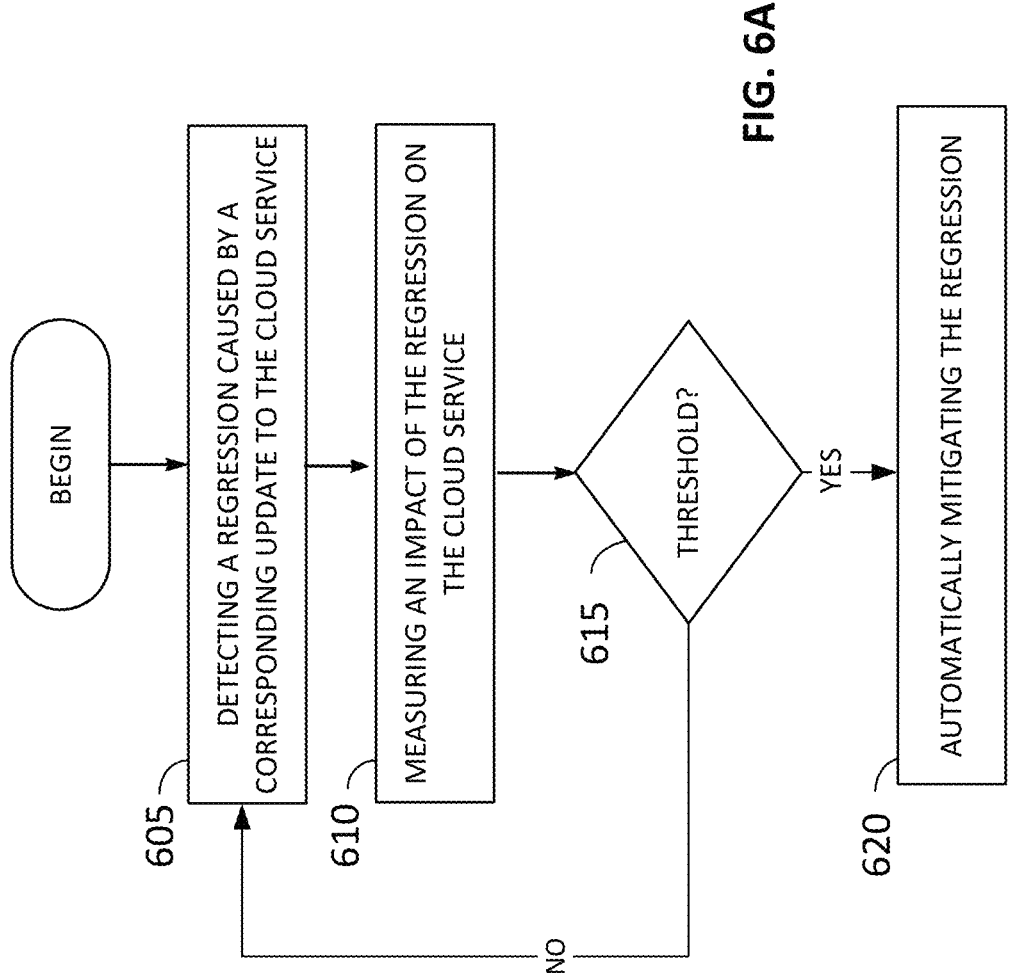
FIG. 6A is a flowchart of a method according to principles described herein.

FIG. 6A is a flowchart of a method according to principles described herein. As shown in FIG. 6A, the method includes detecting 605 a regression caused by a corresponding update to the cloud service. As described above, there are various criteria by which the rollout service can detect and declare a regression, including using QoS signals and comparing telemetry of a current update build to a previous update build.

Next, the method includes measuring 610 an impact of the identified regression. As described above, this can be based on several factors that quantity the inconvenience of the regression to users. This determination may be based on or weighted by the criticality of the web service to a particular segment of the userbase.

The system will also have a threshold or thresholds against which to compare 615 the measurement of the regression impact. If the regression impact exceeds the threshold, the rollout service acts to automatically mitigate 620 the regression. If the regression impact does not exceed the threshold, the rollout service may continue monitoring for additional regressions.

Figure 6B:
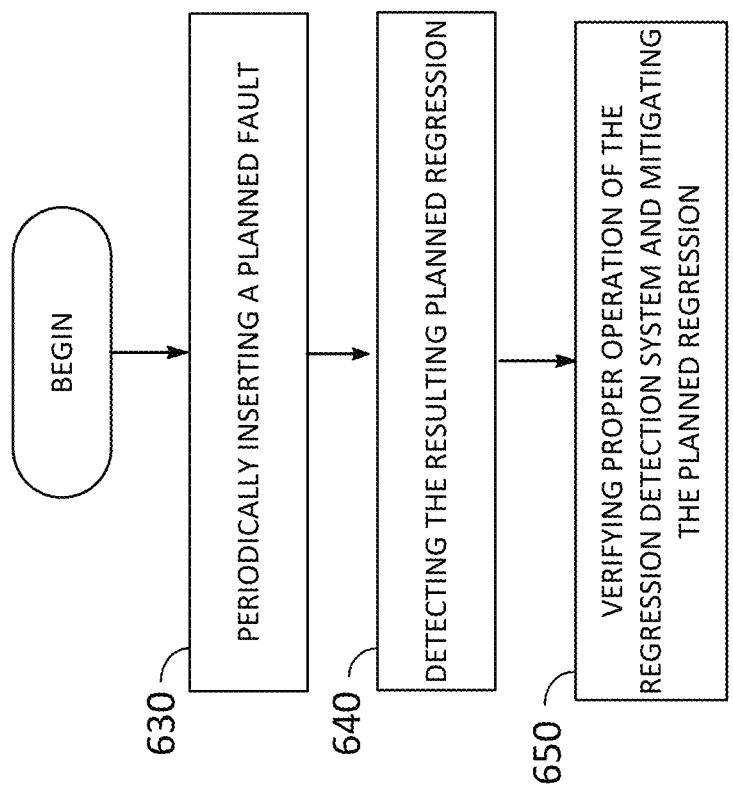
FIG. 6B is another flowchart of a method according to principles described herein.

FIG. 6B is another flowchart of a method according to principles described herein. As shown in FIG. 6B, the method includes periodically inserting a planned fault into an update to the cloud service. This planned fault is configured to cause a regression to test the regression detection and response system. Thus, the method continues with using the regression detection system to detect the planned regression 640 resulting from the planned fault. The method then concludes with verifying the proper operation of the regression detection system and mitigating the planned regression 650. By observing the system's response to the planned regression, an administrator can verify that the regression detection and response system is operating as expected.

FIG. 7 is a block diagram 700 illustrating an example software architecture 702, various portions of which may be used in conjunction with various hardware architectures herein described, which may implement any of the above-described features. This software architecture may represent the software of the rollout service 301 or other component shown in FIG. 4A. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example).

The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
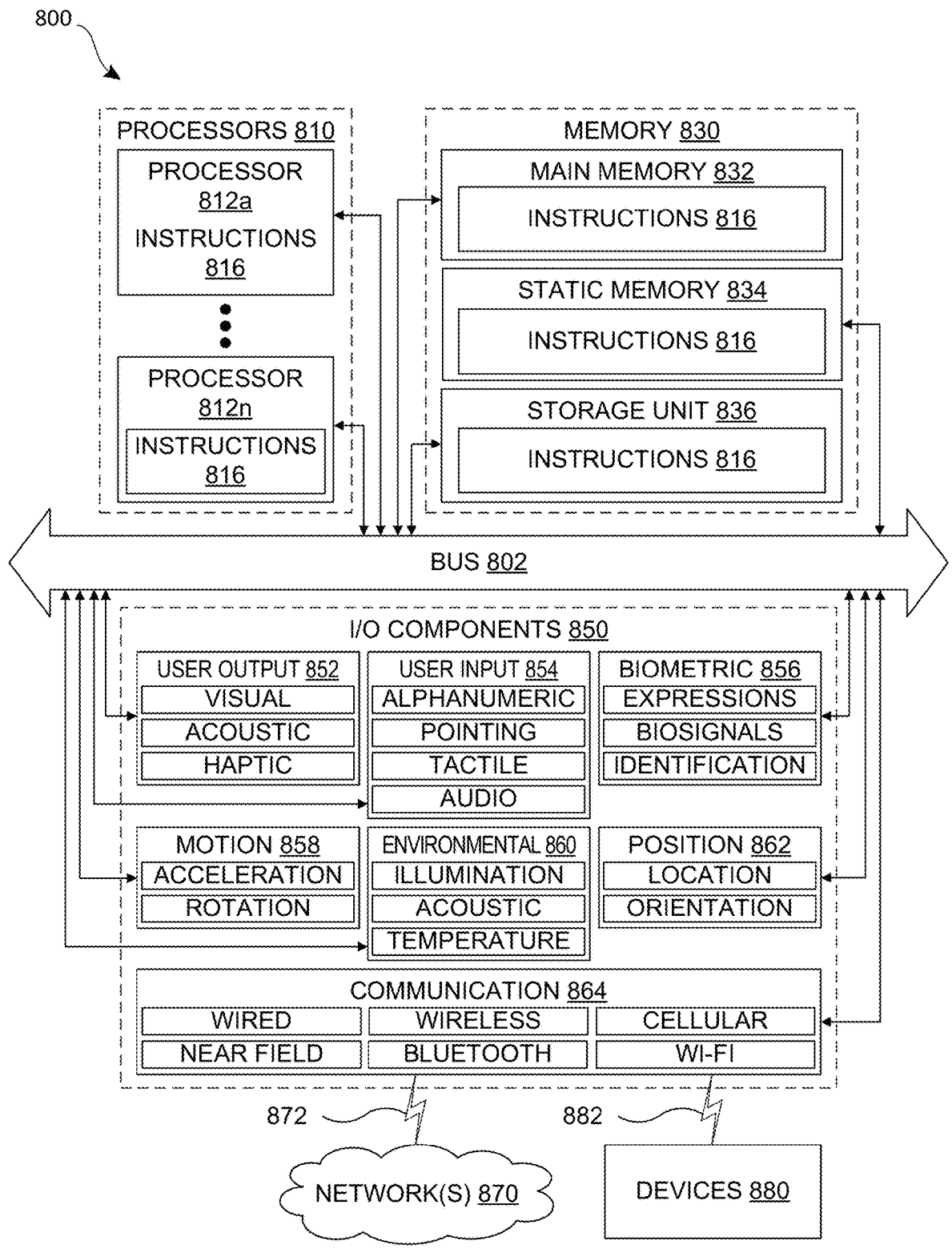
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. This example machine may represent the hardware of the rollout service 301 or other component shown in FIG. 4A.

As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. An orchestration system for implementing a rollout service that deploys a series of updates to a cloud service while minimizing an impact of a regression caused in the cloud service by one of the updates, the system comprising:

an orchestrator host computer hosting the rollout service;

a network interface with a network on which the cloud service is provided; and a database of deployment policy information and records of previous updates to the cloud service;

wherein the rollout service automatically determines a deployment policy for an update using the database, implements a deployment of the update according to the deployment policy, monitors for evidence of a regression caused by the update, and identifies occurrence of the regression caused by the update to the cloud service to enable mitigation of an impact of the regression.

Item 2. The orchestration system of Item 1, further comprising a health engine to automatically detect a regression based on Quality of Service (QoS) signals from components supporting the cloud service.

Item 3. The orchestration system of Item 2, wherein the rollout service receives a health signal from the health engine and, in response to the health signal indicating a regression with a magnitude exceeding a threshold, halts rollout of the update.

Item 4. The orchestration system of Item 2, wherein the health engine focuses on different QoS signals based on a type of update being deployed, where past regressions caused by different types of updates have been correlated to different QoS signals.

Item 5. The orchestration system of Item 2, wherein the health engine compares current QoS signals while rolling out a current build with QoS signals recorded during rollout of a previous build, the rollout service detecting a regression based on a change in the QoS signals corresponding to the current build as compared with the QoS signals corresponding to the previous build.

Item 6. The orchestration system of Item 1, wherein the rollout service quantifies the impact of the regression and, when the impact exceeds a threshold, takes action to mitigate the regression.

Item 7. The orchestration system of Item 6, further comprising:
a state machine that stores a succession of states of the cloud service, wherein the rollout service tags a number of states in the succession of states as "good" based on telemetry received,
the rollout service to return the cloud service to a last known good state in response to a regression by implementing the last known good state from data in the state machine.

Item 8. The orchestration system of Item 7, wherein the rollout service increases a rate at which states are checked and tagged as "good" in response to an increasing level of risk of a current update.

Item 9. The orchestration system of Item 1, further comprising a policy service storing indications of which segments of a userbase are more or less sensitive to a regression;
wherein the rollout service places userbase segments that are more sensitive to a regression in later stages of an update and userbase segments that are less sensitive to a regression in earlier stages of an update.

Item 10. The orchestration system of Item 1, further comprising a temperature monitor for different segments of a userbase, the rollout service to implement a data-driven temperature-based rollout by determining a staged deployment policy for the update based on a temperature of different segments of a userbase.

Item 11. The orchestration system of Item 1, wherein, in response to detection of a regression, the rollout service is to provide information about the regression and a matching change in the update that caused the regression to a number of administrators of client systems of the cloud service.

Item 12. The orchestration system of Item 1, wherein a planned fault that will cause a regression is periodically placed in an update being implemented by the rollout service to test response of the service to a resulting planned regression.

Item 13. A method of rolling out updates to a cloud service to minimize impact of a regression caused in the cloud service by a corresponding update, the method comprising:
detecting the regression caused by the corresponding update in the cloud service;
measuring an impact of the regression on the cloud service; and
when the impact exceeds a threshold, automatically mitigating the regression.

Item 14. The method of Item 13, further comprising mitigating the regression by halting the regression.

Item 15. The method of Item 13, further comprising mitigating the regression by rolling back a state of the cloud service to a last known good (LKG) state.

Item 16. The method of Item 15, further comprising:
with a state machine, storing a succession of states of the cloud service;
tagging a number of states in the succession of states as "good" based on telemetry received; and
returning the cloud service to a state most recently tagged as good to mitigate the regression.

Item 17. The method of Item 16, further comprising increasing a rate at which states are checked and tagged as "good" in response to an increasing level of risk of a current update.

Item 18. The method of Item 13, further comprising periodically inserting a planned fault that will cause a regression in an update being implemented to test response of a rollout service to a resulting planned regression.

Item 19. A method of rolling out updates to a cloud service to minimize impact of a regression caused in the cloud service by a corresponding update, the method comprising:
periodically inserting a planned fault that will cause a regression in an update being implemented to test response of a rollout service to a resulting planned regression;
detecting the planned regression caused by the update in the cloud service; and
mitigating the planned regression.

Item 20. The method of Item 19, further comprising automatically detecting the planned regression based on Quality of Service (QoS) signals from components supporting the cloud service.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. An orchestration system for implementing a rollout service that deploys a series of updates to a cloud service while minimizing an impact of a regression caused in the cloud service by one of the updates, the system comprising:
    a network interface with a network on which the cloud service is provided;
    a database of deployment policy information and records of previous updates to the cloud service; and
    an orchestrator host computer hosting the rollout service, the orchestrator host computer comprising a processor and memory storing instructions that, when executed by the processor, cause the orchestrator host computer to perform operations comprising:
    determining a deployment policy for a first update using the database,
    determining, based on a risk of the first update, a frequency for checking a health metric of a first state of the cloud service, wherein the first state of the cloud service corresponds to the first update,
    deploying the first update according to the deployment policy,
    checking, at the determined frequency for checking the health metric, whether or not the health metric of the first state of the cloud service indicates that the regression in the cloud service has occurred,
    in response to determining that the health metric indicates the regression in the cloud service has not occurred, tagging the first state as a known good state, and
    in response to identifying an occurrence of a regression caused by a second update to the cloud service subsequent to the first update, returning the cloud service to the first state tagged as the known good state.

2. The orchestration system of claim 1, further comprising a service health engine to automatically detect a regression based on Quality of Service (QOS) signals from components supporting the cloud service.

3. The orchestration system of claim 2, wherein the rollout service receives a health signal from the service health engine and, in response to the health signal indicating the regression caused by the second update with a magnitude exceeding a threshold, halts rollout of the second update.

4. The orchestration system of claim 2, wherein the service health engine focuses on different QoS signals based on a type of update being deployed, where past regressions caused by different types of updates have been correlated to different QoS signals.

5. The orchestration system of claim 2, wherein the service health engine compares current QOS signals while rolling out a current build with QoS signals recorded during rollout of a previous build, the rollout service detecting a regression based on a change in the current QoS signals corresponding to the current build as compared with the QoS signals corresponding to the previous build.

6. The orchestration system of claim 1, wherein the rollout service quantifies the impact of the regression caused by the second update and, when the impact exceeds a threshold, takes action to mitigate the regression caused by the second update.

7. The orchestration system of claim 6, further comprising:
    a state machine that stores a succession of states of the cloud service, wherein the rollout service tags a number of states in the succession of states as "good" based on telemetry received,
    the rollout service to return the cloud service to a last known good state in response to the regression caused by the second update by implementing the last known good state from data in the state machine.

8. The orchestration system of claim 7, wherein the rollout service increases a rate at which states are checked and tagged as "good" in response to an increasing level of risk of a current update.

9. The orchestration system of claim 1, further comprising a policy service storing indications of which segments of a userbase are sensitive to the regression caused by the second update;
    wherein the rollout service places the userbase segments that are sensitive to the regression caused by the second update in later stages of the update and userbase segments that are not sensitive to the regression caused by the second update in earlier stages of the second update.

10. The orchestration system of claim 1, further comprising a data-driven temperature monitor for different segments of a userbase, the rollout service to implement a data-driven temperature-based rollout by determining a staged deployment policy for the second update based on a temperature of the different segments of the userbase.

11. The orchestration system of claim 1, wherein, in response to detection of the regression caused by the second update, the rollout service is to provide information about the regression caused by the second update and a matching change in the second update that caused the regression caused by the second update to a number of administrators of client systems of the cloud service.

12. The orchestration system of claim 1, wherein a planned fault that will cause a regression is periodically placed in an update being implemented by the rollout service to test response of the rollout service to a resulting planned regression.

13. The orchestration system of claim 1, wherein
the first update has a corresponding update type indicating which attributes of the cloud service are affected by the first update,
the frequency for checking the health metric of the first state of the cloud service is determined based on a risk of the update type.

14. The orchestration system of claim 1, wherein
the first update has a corresponding update type indicating which attributes of the cloud service are affected by the first update,
the deployment policy includes a selection of Quality of Service (QOS) signals from components of the cloud service, the QoS signals are included in the health metric of the first state of the cloud service, where the QoS signals are selected based on the update type.

15. A method for implementing a rollout service that deploys a series of updates to a cloud service while minimizing an impact of a regression caused in the cloud service by one of the updates, the method comprising:
determining a deployment policy for a first update using a database of deployment policy information and records of previous updates to the cloud service;
determining, based on a risk of the first update, a frequency for checking a health metric of a first state of the cloud service, wherein the first state of the cloud service corresponds to the first update;
deploying the first update according to the deployment policy,
checking, at the determined frequency for checking the health metric, whether or not the health metric of the first state of the cloud service indicates that the regression in the cloud service has occurred;
in response to determining that the health metric indicates the regression in the cloud service has not occurred, tagging the first state as a known good state; and
in respond to identifying an occurrence of a regression caused by a second update to the cloud service subsequent to the first update, returning the cloud service to the first state tagged as the known good state.

16. The method of claim 15, wherein
the first update has a corresponding update type indicating which attributes of the cloud service are affected by the first update, and
the frequency for checking the health metric of the first state of the cloud service is determined based on a risk of the update type.

17. The method of claim 15, wherein
the first update has a corresponding update type indicating which attributes of the cloud service are affected by the first update, and
the deployment policy includes a selection of Quality of Service (QOS) signals from components of the cloud service, the QoS signals are included in the health metric of the first state of the cloud service, where the QoS signals are selected based on the update type.

18. A machine-readable medium storing instructions for implementing a rollout service that deploys a series of updates to a cloud service while minimizing an impact of a regression caused in the cloud service by one of the updates, where the instructions, when executed by a processor, cause:
determining a deployment policy for a first update using a database of deployment policy information and records of previous updates to the cloud service;
determining, based on a risk of the first update, a frequency for checking a health metric of a first state of the cloud service, wherein the first state of the cloud service corresponds to the first update;
deploying the first update according to the deployment policy,
checking, at the determined frequency for checking the health metric, whether or not the health metric of the first state of the cloud service indicates that the regression in the cloud service has occurred;
in response to determining that the health metric indicates the regression in the cloud service has not occurred, tagging the first state as a known good state; and
in respond to identifying an occurrence of a regression caused by a second update to the cloud service subsequent to the first update, returning the cloud service to the first state tagged as the known good state.

* * * * *